(12) United States Patent
Fromentoux et al.

(10) Patent No.: US 11,025,490 B2
(45) Date of Patent: Jun. 1, 2021

(54) METHOD FOR DYNAMICALLY MANAGING A NETWORK SERVICE IN A COMMUNICATION NETWORK

(71) Applicant: Orange, Paris (FR)

(72) Inventors: Gael Fromentoux, Pleumeur Bodou (FR); Frederic Fieau, Paris (FR); Nicolas Bihannic, Trebeurden (FR)

(73) Assignee: ORANGE, Paris (FR)

( * ) Notice: Subject to any disclaimer, the term of this patent is extended or adjusted under 35 U.S.C. 154(b) by 434 days.

(21) Appl. No.: 15/739,901

(22) PCT Filed: Jun. 20, 2016

(86) PCT No.: PCT/FR2016/051502
§ 371 (c)(1),
(2) Date: Dec. 26, 2017

(87) PCT Pub. No.: WO2016/207529
PCT Pub. Date: Dec. 29, 2016

(65) Prior Publication Data
US 2018/0183658 A1   Jun. 28, 2018

(30) Foreign Application Priority Data

Jun. 26, 2015 (FR) .................................... 1555932

(51) Int. Cl.
*H04L 12/24* (2006.01)
(52) U.S. Cl.
CPC ........ *H04L 41/082* (2013.01); *H04L 41/5025* (2013.01); *H04L 41/5054* (2013.01)

(58) Field of Classification Search
CPC ..................................................... G06F 15/177
See application file for complete search history.

(56) References Cited

U.S. PATENT DOCUMENTS

| 2015/0180730 A1* | 6/2015 | Felstaine | H04W 12/08 709/225 |
| 2015/0326535 A1* | 11/2015 | Rao | H04L 41/5054 726/15 |

OTHER PUBLICATIONS

International Search Report dated Sep. 6, 2016 for corresponding International Application No. PCT/FR2016/051502, filed Jun. 20, 2016.

(Continued)

*Primary Examiner* — Nicholas P Celani
(74) *Attorney, Agent, or Firm* — David D. Brush; Westman, Champlin & Koehler, P.A.

(57) ABSTRACT

Method for managing a network service that is in the process of being executed, the service consisting of a sequence of at least one virtual network function managed by an entity for managing virtual resources. The method includes the following steps implemented by an optimizing entity: receiving a stream signaling and/or characterizing a media from a virtual network function of the sequence, which function is called the "initial function"; determining, depending on the stream and a predefined management rule associated with the stream, whether or not the initial function has a sufficient capacity to stably execute the service; sending, to the entity for managing virtual resources, an update command comprising at least one action updating the sequence, the initial function being, after execution of the command, replaced or complemented in the sequence by at least one new virtual network function able to stably execute the network service.

11 Claims, 3 Drawing Sheets

(56) References Cited

OTHER PUBLICATIONS

English translation of the International Written Opinion dated Sep. 6, 2016 for corresponding International Application No. PCT/FR2016/051502, filed Jun. 20, 2016.
"Network Functions Virtualisation ( N FV) ; 1-14 Resiliency Requirements", Group Specification. European Telecommunications Standards Institute ( ETSI), 650, Route Des Lucioles, F-06921 Sophia-Antipolis, France vol. NFV Rel. No. V1.1.1, Jan. 1, 2015 (Jan. 1, 2015), XP014235737.
Etsi Etsi, "Network Functions Virtualisation (NFV); Architectural Framework", Oct. 1, 2013 (Oct. 1, 2013), XP055137013.
"Network Functions Virtualisation (NFV); Management and Orchestration", Group Specification. European Telecommunications Standards Institute (ETSI), 650, Route Des Lucioles; F-06921 Sophia Antipolis Cedex; France, GS NFV-MAN 001 V1.1.1, Dec. 2014.
"Network Functions Virtualisation (NFV); Management and Orchestration" Group Specification, European Telecommunications Standards Institute (ETSI), 650, Route Des Lucioles; F-06921 Sophia-Antipolis; France, vol. NFV. No. V1.1.1, 1, Dec. 1, 2014 (Dec. 1, 2014).
"Network Functions Virtualisation (NFV); Use Cases", Group Specification, European Telecommunications Standards Institute (ETSI), 650, Route Des Lucioles; F-06921 Sophia-Antipolis; France, vol. NFV. No. V1.1.1, Oct. 1, 2013 (Oct. 1, 2013), XP014157405.
"Network Functions Virtualisation (NFV); Architectural Framework", Group Specification, European Telecommunications Standards Institute (ETSI), 650, Route Des Lucioles; F-06921 Sophia-Antipolis; France, vol. NFV. No. V1.1.1, 1, Oct. 1, 2013 (Oct. 1, 2013), XP055137013.

\* cited by examiner

METHOD FOR DYNAMICALLY MANAGING A NETWORK SERVICE IN A COMMUNICATION NETWORK

CROSS-REFERENCE TO RELATED APPLICATIONS

This Application is a Section 371 National Stage Application of International Application No. PCT/FR2016/051502, filed Jun. 20, 2016, the content of which is incorporated herein by reference in its entirety, and published as WO 2016/207529 on Dec. 29, 2016, not in English.

FIELD OF THE DISCLOSURE

The invention lies within the field of telecommunication networks, and relates more particularly to a method for dynamically managing a network service in a communication network

BACKGROUND OF THE DISCLOSURE

The standards organization ETSI (for "European Telecommunications Standards Institute") launched a project called NFV (for "Network Functions Virtualization") at the beginning of 2013, in order to establish, among experts in the telecommunications and information technology sectors, the first specifications in the field of the virtualization (that is to say, the dematerialization) of the functions used in telecommunication networks, referred to hereafter as virtualized network functions, called "VNF functions" (for "Virtual Network Function"). These virtualized network functions enable various network architectures to be used (such as the network core EPC, for "Evolved Packet Core" the network architecture IMS, for "Internet protocol Multimedia Subsystem", and the content distribution network CDN, for "Content Delivery Network"). A network service is more particularly defined by a sequence of at least one virtualized network function, implemented by one or more software modules, for example. The virtualization of these functions is carried out, notably, by interconnected computer systems which implement and host these functions on virtual machines that can be accessed via a network application, for example. These virtual machines use remote computing and hardware resources (e.g. network connectivity, computing power, storage spaces, servers, applications, etc.), managed by the cloud computing system and shared among its various clients on the basis of their respective requirements. The clients may thus access these resources in a developing way, without the need to administer the underlying infrastructure for managing these resources, which is often complex.

The ETSI specification document GS NFV 001 v.1.1.1, published in October 2013, entitled "Network Functions Virtualization (NFV); Use Cases", describes a number of cases of use of the virtualization of network functions. This document describes in a very general way the virtualization of network functions in different contexts (virtualization of a mobile network, of a base station, of a content distribution network, etc.). The network services proposed in such a virtualized network architecture are, notably, limited to a predefined list of network services maintained by an orchestration entity, called the "NFVO entity" (for "Network Functions Virtualization Orchestrator"). The creation of the virtualized network functions is also carried out by virtualized resources management entities, called "VNFM entities" (for "Virtual Network Function Manager"), under the control of the orchestration entity.

This type of virtualized network architecture suffers from a number of drawbacks. The systematic intervention of the orchestration entity during the creation of virtualized network services makes it impossible to respond in a reactive way to a change in the network conditions (e.g. an increase in the traffic relating to the service, or a network incident) in which a network service is implemented. The pre-planned implementation of these services may also prove to be unsuitable for the actual conditions of use of these services.

SUMMARY

According to a first aspect, the invention relates to a method for managing a network service that is in the process of being executed, in a communication network, the network service being formed by a sequence of at least one virtualized network function managed by a virtualized resources management entity, comprising the following steps implemented by a virtualized network function optimization entity:

receiving a stream signaling and/or characterizing a media from a virtualized network function of the sequence, called the "initial function";

determining, on the basis of the received stream signaling and/or characterizing a media, and of a predefined management rule associated with the stream, that the initial function has insufficient capacity for the stable execution of the network service;

sending, to the virtualized resources management entity, an updating command comprising at least one action, produced on the basis of the management rule associated with said stream, for updating the sequence, the initial function being, after execution of the command, replaced or complemented in the sequence with at least one new virtualized network function capable of stably executing the network service.

The method enables the network service that is in the process of being executed to be dynamically updated. It is thus possible to respond in real time to unplanned demands for this service. Such an unplanned demand may be, for example, an unanticipated increase in demand for a service that tends to persist over time. By means of the method, the network service may then be modified to meet the demand.

The analysis of the stream signaling and/or characterizing a media (such as a WebRTC, for "Web Real-Time Communication", stream, a HAS, for "HTTP Adaptive Streaming", video stream, or monitoring data relating to a media stream) received by the optimization entity also makes it possible to identify precisely, and in real time, the adequacy of the virtualized network function transmitting this stream for the updated network traffic conditions. By taking predefined management rules into account, it is also possible to verify, for example, that the initial function meets quality of service criteria defined by the communication network operator, and to launch the updating of the function if necessary. The same management rules also make it possible to obtain actions for updating the sequence, such as the replacement of the initial function with a new virtualized network function capable of providing stable execution of the network service. Such a management rule is, for example, a predefined threshold relating to a given quality of service parameter associated with the network service implemented, below which the initial function is considered to have insufficient capacity for the stable execution of the network service that is in the process of being executed. Vice versa, the updating of the virtualized network function is such that, after the sequence has been updated, the given quality of service parameter associated with the network service implemented is above this threshold.

The method also allows greater reactivity during the implementation of the service, if there is persistent fluctuation of the network traffic relating to the service. The command for updating the sequence of virtualized network functions is sent directly to the virtualized resources management entity which manages the virtualized network function to be modified in the sequence. It should be noted here that, in the prior art, no modification of the sequence of network functions may be carried out while the service is executed, without a previous request to an orchestration entity responsible for controlling the virtualized resources management entities of the network. Thus the method has the advantage of allowing an autonomous and speedy update of the network service in the process of its execution, without the intervention of other third-party entities.

Since the updating of the sequence is also performed in real time, the method can ensure the continuity of the network service implemented. Furthermore, since the updating is instantaneous, it remains transparent for the terminal or any other user device of the network service that is in the process of being executed. Thus the method may be used to improve both the quality of service and the quality of experience associated with the network service that is in the process of being executed.

According to a particular characteristic, the method further comprises a step of determining the capacity required for the stable execution of the network service, the necessary capacity being sent to the virtualized resources management entity with the updating command, the sequence being updated on the basis of the required capacity.

The determination of the capacity required for the stable execution of the network service enables the virtualized network function optimization entity to define precisely the updating requirements of the virtualized network function from which the streams signaling and/or characterizing the media have been received.

According to a particular characteristic, the initial function is implemented in a given first geographic area. The method then comprises, before the sending step, if the initial function is implemented by saturated resources of the first area, a determination of a second geographic area having non-saturated resources, the updating command causing an update of the sequence, in which the at least one new virtualized network function belongs to the second geographic area.

The method may advantageously be used to exploit virtualized network functions of a geographic area other than that in which the initial function is implemented. According to the known methods, called "auto-scaling" methods, a new virtualized network function may be implemented only on the same infrastructure as that on which the initial function is implemented, or in other words at the same point of presence (abbreviated in English to "PoP"). Thus the network service may advantageously make use of virtualized network functions implemented by an infrastructure of a geographic area whose resources are unused or partially used. The load on the resources of the infrastructure in which the initial function is implemented may thus be reduced, and the quality of service improved.

According to a particular characteristic, a virtualized network function identical to the initial function, called the "identical function", is implemented in the second geographic area before the sending step, and the updating command causes the virtualized resources management entity to replace the initial function or complement it, in the sequence, with the identical function.

If a virtualized network function of a second geographic area exists and is already performing the function associated with the initial function, there is no need to create a new virtualized network function in this first area. The operations of creating new virtualized network functions are avoided. It is only necessary to route the signaling streams of the initial function to the identical function of the second geographic area, and to update the sequence. Thus the method is accelerated.

According to a particular characteristic, the network service formed from a sequence of at least one virtualized network function, called the "initial sequence", belongs to a list of network services of an orchestration entity responsible for controlling the virtualized resources management entities of the network, the method further comprising:
  notification, by the virtualized resources management entity to the orchestration entity, of the updated sequence;
  updating, by the orchestration entity, of the network service formed from the initial sequence in the list.

The updating of the list of network services is performed by an ascending approach, as opposed to the known prior art methods which are based on a descending approach. The reader is reminded that in a descending approach the network services are initially defined, and the sequences of virtualized network functions are then configured on the basis of the network services defined in this way. In this approach, a network service entered in the list of network services cannot have its sequence of virtualized network functions modified subsequently. Only the resources assigned to the virtualized network functions may be changed. The ascending approach, for its part, consists in monitoring the implementation of each of the virtualized network functions of the sequence of virtualized network functions forming the executed network service. These virtualized network functions are then updated individually on the initiative of the virtualized network function optimization entity, independently of the other virtualized network functions in the sequence, where necessary. This takes place, notably, when any of these virtualized network functions do not have the necessary capacity to perform its function. Each of the virtualized network functions updated in this way contributes to the updating of the network service itself, that is to say to a redefinition of the network service or to a definition of a new network service. Thus the method may be used to profit from the updating of the sequence of virtualized network functions while the service is in the process of being executed, by allowing the later re-use of the network service optimized in this way. It is then no longer necessary to reiterate the process of updating, when starting, for example, from a network service which was initially underdesigned, or which no longer meets the newly updated quality of service requirements for this network service.

According to a particular characteristic, the updating of the network service formed from the initial sequence consists, in the list, of:
  replacing the network service formed from the initial sequence with a network service formed from the updated sequence; or
  adding a network service formed from the updated sequence.

By replacing the network service formed from said initial sequence with a network service formed from said updated sequence in the list, it is possible to keep only the "optimized" network services in the list. These network services are based, in particular, on sequences of virtualized network functions whose technical characteristics are suitable for the latest changes in the network traffic associated with them. This makes it possible, notably, to avoid overloading the list, and to retain a limited number of network services when, for example, the size of the list is limited by memory space constraints or by operational constraints.

However, if there are no memory space constraints regarding the size of the list, a network service formed from an updated sequence may simply be added to the list, the network service formed from the initial sequence also being retained. Thus the method may be used to return to the implementation of a service initially in the list when, for example, the network traffic relating to a newly added network service decreases in a continuing way, the latter service unnecessarily monopolizing some of the network resources.

According to a second aspect, the invention relates to a virtualized network function optimization entity, in a communication network. The optimization entity comprises:

a receiving module, arranged to receive a stream signaling and/or characterizing a media from a virtualized network function, called the "initial function", of a sequence of at least one virtualized network function forming a network service that is in the process of being executed;

a first determination module, arranged to determine, on the basis of the received stream signaling and/or characterizing a media, and of predefined management rules associated with the stream, that the initial function has insufficient capacity for the stable execution of the network service;

a sending module, arranged to send, to a virtualized resources management entity responsible for managing the initial function, a command for updating the sequence, the initial function being, after execution of the command, replaced or complemented in the sequence with at least one new virtualized network function capable of stably executing the network service.

According to a particular characteristic, the optimization entity further comprises a second determination module, arranged to determine the capacity required for the stable execution of the network service, the sending module being arranged to send the capacity to the virtualized resources management entity with the updating command.

According to a particular characteristic, the optimization entity according to the second aspect further comprises a third determination module, arranged to determine a geographic area having non-saturated resources, the sending module being arranged to send an updating command causing an update of the sequence, in which the at least one new virtualized network function belongs to the geographic area having non-saturated resources.

According to a third aspect, the invention relates to an virtualized resources management entity, in a communication network. The virtualized resources management entity comprises:

a management module, arranged to manage a virtualized network function, called the "initial function", of a sequence of at least one virtualized network function forming a network service;

a receiving module, arranged to receive a command for updating the sequence from a virtualized network function optimization entity;

an execution module, arranged to execute the updating command, the initial function being, after execution of the command, replaced or complemented in the sequence with at least one new virtualized network function capable of stably executing the network service;

a sending module, arranged to send a notification of the updating of the sequence to an orchestration entity.

According to a fourth aspect, the invention relates to a system for managing a network service, in a communication network. The system comprises:

a virtualized network function optimization entity according to the second aspect; and a virtualized resources management entity according to the third aspect.

According to a particular characteristic, the system further comprises:

an orchestration entity responsible for controlling at least one virtualized resources management entity according to the third aspect.

The advantages mentioned for the management method according to the first aspect are directly transferable to the optimization entity according to the second aspect and to the management system according to the fourth aspect.

According to a fifth aspect, the invention also relates to a program for a virtualized network function optimization entity, comprising program code instructions intended to command the execution of the steps of the method described above, when said program is executed by said optimization entity, and a recording medium, readable by an optimization entity, on which a program for an optimization entity is recorded.

BRIEF DESCRIPTION OF THE DRAWINGS

The invention will be more readily understood with the aid of the following description of particular embodiments, with reference to the attached drawings, in which.

DETAILED DESCRIPTION OF ILLUSTRATIVE EMBODIMENTS

Figure 1:
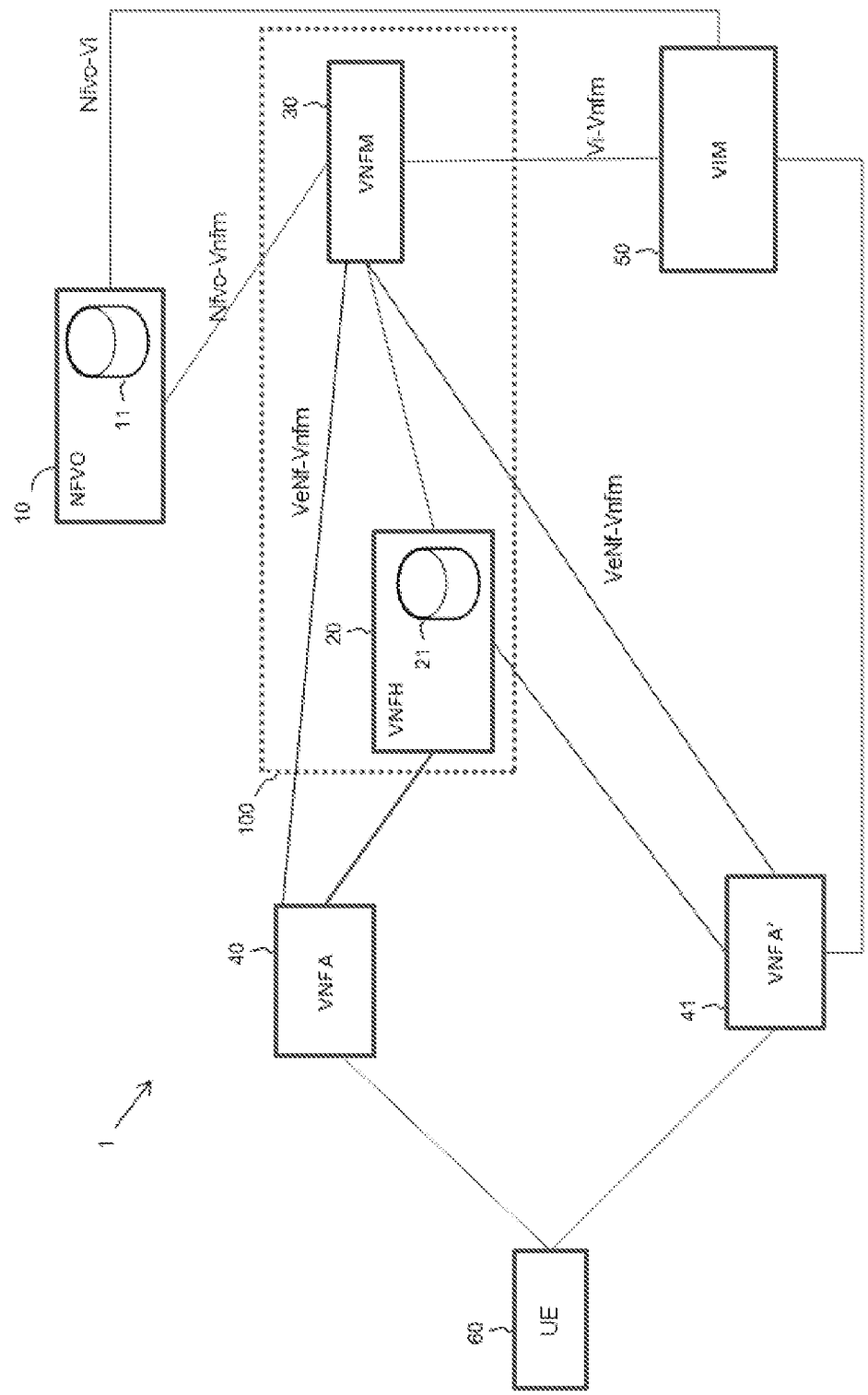
FIG. 1 shows a system for managing a network service according to a particular embodiment.

FIG. 1 shows a system 100 for managing a network service in its environment according to a particular embodiment. The system 100 comprises a virtualized network function optimization entity 20 and a virtualized resources management entity 30. Optionally, the system 100 also comprises an orchestration entity 10.

The orchestration entity 10 is more particularly responsible for controlling the virtualized resources management entities 30 and the virtualized infrastructure management entities 50 of the communication network 1 in which the system 100 is implemented. The orchestration entity 10 has a list 11 of network services. This list 11 is, for example, a database arranged to store network services and sequences of at least one virtualized network function corresponding to these services. The list specifies, notably, a predefined operational behavior of the virtualized network functions on which the network services of the list 11 are based, together with the resources required (e.g. number of virtual machines, memory, bandwidth, latency) for the purpose of deploying these functions and implementing the network services in the list. The virtualized network functions are described by descriptors of virtualized network functions (in English, "VNF descriptor", for "Virtual Network Function descriptor"), as defined by ETSI. The virtualized network functions correspond to functions provided by the operator of the communication network 1 for processing a data packet sent, for example, from a user terminal 60. By way of non-limiting example, these functions may be network address translation or firewall services, or services for load sharing, transcoding, caching, request optimization, or even network packet enrichment.

According to the NFV architecture defined in the ETSI specification document "GS NFV-MAN 001", published in July 2014, when a network service from the list 11 is implemented in the communication network 1, the orchestration entity 10 approaches the virtualized resources management entities responsible for managing the virtualized network functions of the sequence of at least one virtualized network function forming this network service. Each virtualized resources management entity is associated with a virtualized network function in the sequence. More particularly, a virtualized resources management entity is used to manage the life cycle of a virtualized network function, that is to say its creation, its implementation and its termination. The virtualized network functions are installed for this purpose on virtual machines (see above) created and managed by a virtualized infrastructure management entity 50. A virtualized resources management entity receives, from a virtualized network function for which it is responsible, information called "FCAPS" (for "Fault, Configuration, Accounting, Performance, Security") concerning error management, configuration, usage, performance, and security relating to this virtualized network function. This information, notably, enables such a virtualized resources management entity to adapt the resources assigned to a virtualized network function. By way of example, the virtualized resources management entity 30 is responsible for managing the virtualized network functions A 40 and A' 41. These virtualized network functions 40-41 provide, for example, the functions of a proxy web server.

The system 100 also comprises an entity 20 for optimizing virtualized network functions. This optimization entity 20 is interfaced with the virtualized resources management entity 30 and the virtualized network functions 40-41. The optimization entity 20 may be used to launch a dynamic modification of a network service in the process of being executed. Notably, it enables an initial implementation of a network service in the list 11 to be adapted. The optimization entity 20 receives information FCAPS (e.g. alarm or performance indicators) together with the signaling streams sent by the virtualized network functions 40-41. The signaling streams are, for example, real-time streams of the WebRTC type, or even streams relating to a media traffic profile (e.g. encoding, bit rate, or latency information), also called media characterizing streams. The optimization entity 20 also has management rules 21 predefined by the operator of the communication network 1. These management rules are associated with the types of stream sent by the virtualized network functions 40-41. When they are combined with the information obtained from the virtualized network functions 40-41, they enable the optimization entity 20 to determine that a virtualized network function has insufficient capacity for the stable execution of the network service in the process of being executed. The optimization entity 20 then launches an update of the virtualized network function 40 in the process of being executed, by determining a virtualized resources management entity 30 to which an updating command will be sent, comprising at least one action, produced on the basis of the management rule associated with the sent stream, for updating the sequence. The updating of a virtualized network function will be detailed below with reference to FIG. 2. By way of illustrative example, the virtualized network function that is in the process of being executed A 40 is updated and replaced with the virtualized network function A' 41, the latter function providing stable execution of the network service in the process of being executed.

The communications between the virtualized resources management entity 30, the virtualized infrastructure management entity 50 and the virtualized network functions 40-41 of the communication network 1 are provided via interfaces such as those defined in the "GS NFV-MAN 001" specification document. More precisely, the virtualized resources management entity 30 communicates with the virtualized network function 40 and with the virtualized network function 41 via interfaces VeNf-Vnfm. The virtualized resources management entity 30 also communicates with the virtualized infrastructure management entity 50 via an interface Vi-Vnfm.

The interface Nfvo-Vnfm for communication between the orchestration entity 10 and the virtualized resources management entity 30 is also enriched by comparison with its definition in the ETSI specification document, and may be used, notably, to notify an update of a service in the process of being executed, launched by the optimization entity 20, and comprises sending information such as popularity indicators of a network service, or even information on the quality of service delivered by a network service. The orchestration entity 10 is thus capable of enriching its list 11 of network services.

Only one virtualized resources management entity 30 is shown, but there is no limit on the number of virtualized resources management entities implemented to supply a network service. Additionally, in another embodiment, while a virtualized resources management entity 30 can manage a plurality of virtualized network functions, a virtualized network function can be managed by one or more virtualized resources management entities.

Only two virtualized network functions 40-41 are shown, but there is no limit on the number of virtualized network functions in the sequence of virtualized network functions forming a network service.

Figure 2:
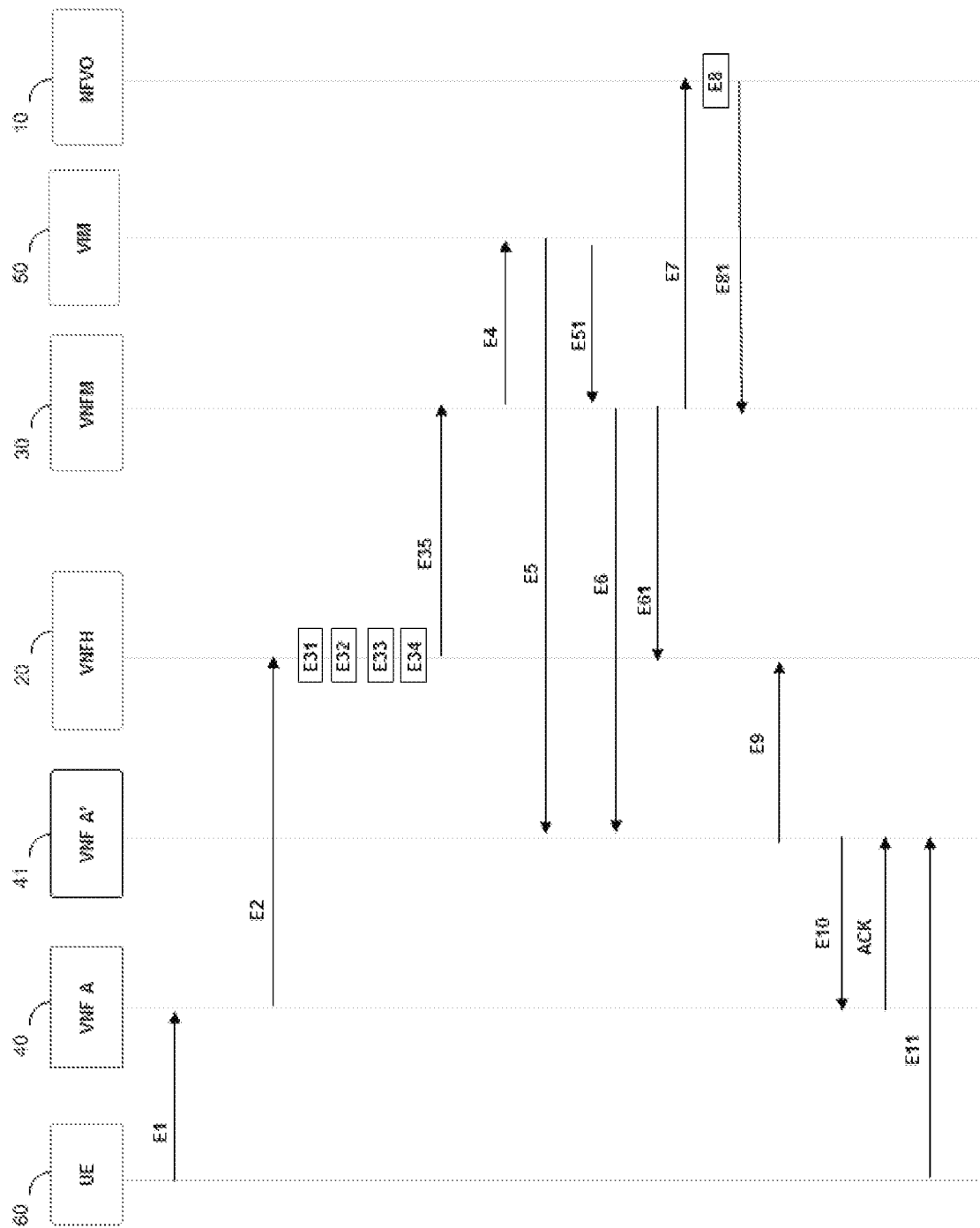
FIG. 2 shows the steps of the management method according to a particular embodiment.

The method for managing a network service that is in the process of being executed will now be described with reference to FIG. 2. It is assumed hereafter that the context is a network configuration such as that described with reference to FIG. 1.

In a step E1, the terminal UE 60 sends an HTTP (for "HyperText Transfer Protocol") request to the virtualized network function VNF A 40. The virtualized network function VNF A 40 is, for example, a web proxy function, called the "initial function", of a sequence S of at least one virtualized network function forming a network service SR in a list of network services of the orchestration entity NFVO 10.

In a step E2, the initial function VNF A 40 is subjected to overloading, which it notifies to the virtualized network function optimization entity 20 via a signaling stream. This notification is, for example, network traffic information relating to a loading time of a web page or of an element of a web page above a predefined threshold value which enables network overloading to be identified. In order to reach the virtualized network function optimization entity 20, the initial function VNF A 40 uses an address of this entity, obtained for example during the initial configuration of the network service SR that is in the process of being executed. The virtualized network function optimization entity 20 thus receives the signaling stream with information indicating the fact that the initial function 40 is overloaded.

In a step E31, the optimization entity 20 then identifies the type of signaling stream received. This identification is performed, for example, on the basis of a header of a data packet in the signaling stream. By way of example, it will be assumed that the stream is of the WebRTC type.

Then, in a step E32, the optimization entity 20 determines, on the basis of the signaling stream and of a predefined management rule 21 associated with the stream, that the initial function 40 has insufficient capacity for the stable execution of the network service SR. For this purpose, the optimization entity 20 obtains, on the basis of the type of signaling stream, a management rule 21 indicating one or more criteria relating, for example, to a quality of service to be complied with for the network service SR. By way of example, the management rules 21 are stored locally by the optimization entity 20 in a data structure having the following form:

| Type of stream | Condition(s) | Action(s) |
| --- | --- | --- |
| WebRTC | latency >100 ms and overload_PoP | create_on_non_loaded_PoP(VNF A') |
| HAS video | bit rate < D | duplicate(VNF A; VNF A') |

The rules defined by this data structure may be used to identify actions to be taken for a given type of stream, under certain conditions, in order to provide stable execution of the network service SR by modifying its sequence S of virtualized network functions. These actions comprise, at least, an action of updating the initial function 40. In this example, the management rules indicate, for a WebRTC stream, when the measured latency is greater than 100 ms and the point of presence in which the network service SR is executed is overloaded, that a virtualized network function VNF A' 41 should be created at a non-loaded point of presence. Similarly, for a HAS video stream, these rules indicate that the virtualized network function should be duplicated when the detected bit rate is below a threshold D predefined by the operator. These management rules are provided by way of illustration, but there is no limit on the criteria that may be taken into account in these rules. Thus, the bit rate criterion detected for a HAS video stream may advantageously be replaced, if appropriate, with a session starting time above a predefined threshold, with a buffer memory storage time above a predefined threshold, or even with any other measurement relating to a session in progress. The updating actions thus correspond, depending on whether the stream is of the WebRTC or "HAS video" type, to the creation of a virtualized network function VNF A' 41 or to the duplication of the initial function VNF A 40 in a virtualized network function VNF A' 41, respectively. The updating actions are not limited to a creation or duplication of a virtualized network function. Such an action may also consist in completing one virtualized network function in the sequence with one or more other virtualized network functions.

The virtualized network function VNF A' 41 is such that a stable implementation of the network service SR is ensured. In order to ensure a stable implementation of the network service SR, or in other words to respond to the increased load detected in step E2 in this case, the optimization entity 20 determines, in a step E33, a number of expected characteristics of the virtualized network function VNF A' 41. This is a matter, notably, of determining the capacity that the virtualized network function VNF A' 41 must have for the stable execution of the network service SR. The optimization entity 20 determines, notably, expected performance criteria (e.g. authorized packet loss, maximum acceptable latency, geographical constraint), the application functions that are to be supported by the virtualized network function VNF A' 41 (e.g. the 3GPP MTC, for "3rd Generation Partnership Project Machine Type Communication", and 3GPP PMR, for "3rd Generation Partnership Project Professional Mobile Radio", functions), and the network location of the virtualized network function VNF A' 41. When the resources of the geographic area in which the initial function VNF A 40 is implemented are saturated, the network location for VNF A' 41 is also chosen in such a way that the area in which the virtualized network function VNF A' 41 will be implemented comprises non-saturated resources and is distinct from the area in which the initial function VNF A 40 is implemented.

At the end of steps E32 and E33, the actions and the characteristics for updating the sequence S of virtualized network functions forming the network service SR are identified.

In a step E34, the optimization entity 20 then identifies a virtualized resources management entity 30 to which a command for updating the sequence S is to be sent. The optimization entity 20 obtains an identifier of the initial function VNF A 40, from the signaling stream received in step E2, and, by means of a predefined correspondence table for example, identifies the virtualized resources management entity 30 responsible for this function.

Then, in a step E35, the optimization entity 20 sends the updating command to the virtualized resources management entity with the actions identified in step E32 and the required characteristics such as those determined in step E33. The optimization entity 20 thus requests the virtualized resources management entity 30 to create a new virtualized network function VNF A' 41 in order to ensure the stability of the network service SR, in response to the increased load detected in step E2.

In a step E4, the virtualized resources management entity 30 sends to the virtualized infrastructure management entity 50 the characteristics required for the virtualized network function VNF A' 41 whose creation it is requesting.

In a step E5, the virtualized infrastructure management entity requests the physical resources of the virtualized infrastructure to allocate new resources for the virtualized network function VNF A' 41. The virtualized network function VNF A' 41 is then created on the physical resources allocated for this purpose.

In a step E51, the virtualized infrastructure management entity sends an acknowledgement to the virtualized resources management entity 30, indicating to the latter that physical resources have been allocated for the virtualized network function VNF A' 41.

In a step E6, the virtualized resources management entity 30 implements the elementary network function VNF A' 41 on the physical resources allocated by the virtualized infrastructure management entity 50.

Then, in a step E61, the virtualized resources management entity 30 sends an acknowledgement to the optimization entity 20, indicating to the latter that the virtualized network function VNF A' 41 has been implemented in response to the command for updating the network service SR.

In a step E7, the virtualized resources management entity 30 notifies the orchestration entity 10 of the updating of the sequence S of virtualized network functions, informing it that the virtualized network function VNF A' 41 has been created.

Then, in a step E8, the orchestration entity 10 updates its list of network services. More precisely, the orchestration entity 10 updates the sequence of virtualized network functions for the network service SR in its list of network services. For this purpose, the orchestration entity 10 modifies the network service SR by replacing the sequence of virtualized network functions that was initially in the list with the updated sequence. This update also comprises the characteristics required for the stable implementation of the network service SR (e.g. information about the connectivity between virtualized network functions, the location of the new virtualized network function, and the resources allocated). In another embodiment, the list is updated by adding a new network service corresponding to the updated sequence in the list 11 of network services.

In a step E81, the orchestration entity 10 notifies the virtualized resources management entity 30 of the updating of the network service SR in its list.

In a step E9, the virtualized network function VNF A' 41 sends a request to the optimization entity to take over the sessions in progress that are currently handled by the initial function VNF A 40.

In a step E10, the virtualized network function VNF A' 41 informs the initial function VNF A 40 that it is taking over the streams for which a network traffic overload has been identified in step E2. The virtualized network function VNF A 40 sends an acknowledgement message to the virtualized network function VNF A' 41 in response to the take-over request. The requests sent by the terminal UE 60 which could not be handled by the virtualized network function VNF A 40 may thus be handled by the virtualized network function VNF A' 41.

Finally, in a concluding step E11, the new requests sent by the terminal UE 60, together with the streams for which a network traffic overload has been identified, are directly handled by the virtualized network function VNF A' 41. This operating mode continues throughout the period in which the optimization entity 20 considers that the initial function VNF A 40 is overloaded. The stability of the network service SR is thus ensured. On the other hand, if the network traffic ceases to be overloaded, a new update of the sequence of virtualized network functions in the process of being executed may be triggered by the optimization entity 20, in order to re-update the network service that is in the process of being executed, for example on the basis of a new traffic state measured in real time and notified by the latter entity to the virtualized resources management entity 30. This new update is initiated by the optimization entity 20 according to step E35.

In step E33, if a virtualized network function VNF A' 41 executing a function identical to the initial function VNF A 40 is already present in a geographic area comprising non-saturated resources, distinct from the geographic area in which the initial function VNF A 40 is implemented, the updating of the sequence consists in replacing the initial function VNF A with the virtualized network function VNF A' 41 that is already implemented in this other geographic area. Thus the steps of allocating resources for the virtualized network function VNF A' 41 and creating the latter are advantageously replaced with a step of establishing a connection with the virtualized network function of this other geographic area.

In another embodiment, only the signaling streams for which a network traffic overload is detected are redirected toward the optimization entity 20 before being transmitted toward the new virtualized network function VNF A' 41.

In yet another embodiment, the signaling streams for which a network traffic overload is detected are not redirected toward the optimization entity 20, but are placed on standby at the initial function VNF A 40 until the new virtualized network function VNF A' 41 is created and activated.

In another embodiment, the signaling streams from the virtualized network function 40 are handled by the optimization entity 20 which, when it takes over what are known as scaling operations (e.g. multi-PoP scaling out), cuts off the virtualized resources management entity 30, which no longer receives these requests.

In another embodiment, the virtualized resources management entity 30 sends a request to the orchestration entity 10 for confirmation regarding the updating of the sequence S of virtualized network functions. This confirmation request is, for example, carried out during step E7 of notifying the updating of the sequence. If the update is not confirmed by the orchestration entity 10, the latter then sends a backtracking command consisting in re-implementing the initial function VNF A 40. This ensures that the update conforms to a local policy of the orchestration entity 10.

In another embodiment, an optimization entity 20 is implemented for each occurrence of a network service implemented. This embodiment makes it possible to apply very precise management policies for each type of service (e.g. higher frequency of verification of the quality of the service). The optimization entity 20 is then implemented at the moment of implementation of an occurrence of a network service.

In another embodiment, an optimization entity 20 is responsible for the updating of a plurality of occurrences of a network service. This embodiment has the particular advantage of requiring fewer optimization entities 20 in the communication network 1. In particular, the implementation of a new optimization entity 20 on each update of a network service is avoided. This embodiment is relevant when the optimization rules are generic to all the occurrences of a network service.

Figure 3:
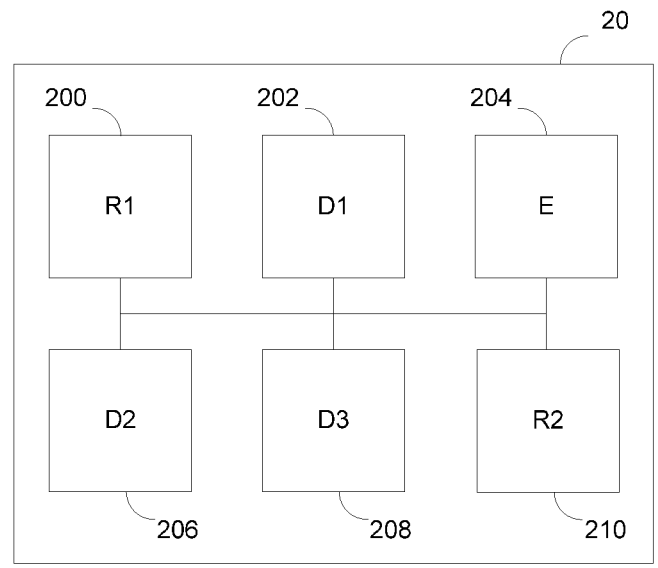
FIG. 3 shows a virtualized network function optimization entity according to a particular embodiment.

FIG. 3 shows a virtualized network function optimization entity 20 according to a particular embodiment. The optimization entity 20 comprises:

- a receiving module 200, arranged to receive a stream signaling and/or characterizing a media from a virtualized network function, called the "initial function", of a sequence of at least one virtualized network function forming a network service that is in the process of being executed;
- a first determination module 202, arranged to determine, on the basis of the received stream signaling and/or characterizing a media, and of predefined management rules associated with the stream, that the initial function has insufficient capacity for the stable execution of the network service;
- a sending module 204, arranged to send, to a virtualized resources management entity responsible for managing the initial function, a command for updating the sequence, the initial function being, after execution of the command, replaced or complemented in the sequence with at least one new virtualized network function capable of stably executing the network service.

In another embodiment, the optimization entity further comprises an obtaining module, arranged to obtain management rules, the first determination module 202 being arranged to determine that the initial function has insufficient capacity for the stable execution of the network service on the basis of said rules.

In another embodiment, the optimization entity 20 further comprises a second module 210 for receiving data output from the network. These network data are, for example, received from a probe that may be implemented in a dynamic way by the optimization entity 20. Such a probe is, for example, positioned on an interface of the equipment implementing the virtualized network function in the process of being executed (e.g. a probe on an interface of equipment supporting a TURN, for "Traversal Using Relays around NAT", server function in order to retrieve, for example, a state of loading of a network connection). The use of such a probe provides, notably, a more detailed analysis of the signaling and/or media streams sent by the virtualized network function in the process of being executed. The precision of the updating of the sequence of virtualized network functions of the network service is also increased. In this embodiment, the first determination module 202 is also arranged to take into account the information received from the second receiving module 210 during the determination that the initial function has insufficient capacity for the stable execution of the network service.

In another embodiment, the optimization entity 20 further comprises a second determination module 206, arranged to determine the capacity required for the stable execution of the network service, the sending module being arranged to send the capacity with the updating command to the virtualized resources management entity 30 responsible for the initial function.

In yet another embodiment, the optimization entity 20 comprises a third determination module 208, arranged to determine a geographic area having non-saturated resources, the sending module being arranged to send an updating command causing an update of the sequence, in which the at least one new virtualized network function belongs to this geographic area.

Figure 4:
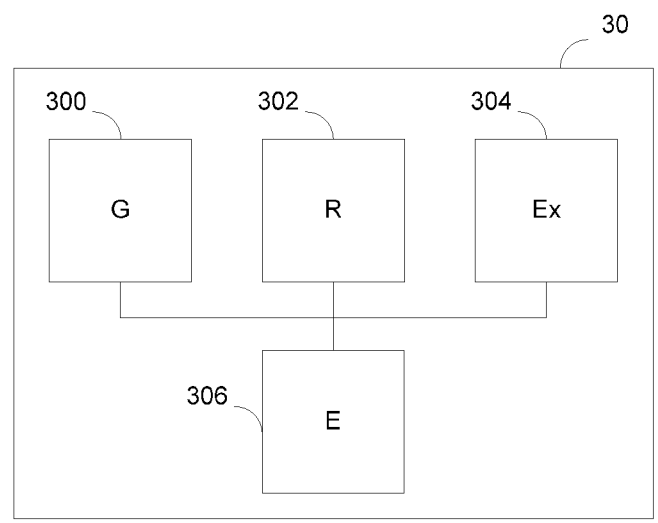
FIG. 4 shows a virtualized resources management entity according to a particular embodiment.

FIG. 4 shows a virtualized resources management entity 30 according to a particular embodiment. The virtualized resources management entity comprises:

- a management module 300, arranged to manage a virtualized network function, called the "initial function", of a sequence of at least one virtualized network function forming a network service;
- a receiving module 302, arranged to receive a command for updating the sequence from a virtualized network function optimization entity 20;
- an execution module 304, arranged to execute the updating command, the initial function being, after execution of the command, replaced or complemented in the sequence with at least one new virtualized network function capable of stably executing the network service;
- a sending module 306, arranged to send a notification of the updating of the sequence to an orchestration entity 10.

The invention is implemented by means of software and/or hardware components. In this context, the term "module" may equally well refer, in this document, to a software component, to a hardware component, or to a set of hardware and/or software components, adapted to perform a function or a set of functions as described above for the module in question.

A software component is considered to be one or more computer programs, one or more sub-programs of a program, or more generally any element of a program or a software package. Such a software component is stored in memory and is then loaded and executed by a data processor of a physical entity, and can access the hardware resources of this physical entity (memory devices, recording media, communications bus, input/output circuit cards, user interfaces, etc.).

Similarly, a hardware component is considered to be any element of a hardware assembly. It may be a hardware component, whether programmable or non-programmable, with or without an integrated processor for executing software. For example, it may be an integrated circuit, a chip card, a circuit card for executing microsoftware (firmware), etc.

In a particular embodiment, the modules 200, 202, 204, 206, 208 and 210 are arranged to implement the management method described above. They are preferably software modules comprising software instructions for the execution of those of the steps of the management method described above, implemented by an optimization entity. The invention therefore also concerns:

- a program for an optimization entity, comprising program code instructions intended to command the execution of the steps of the management method described above, when said program is executed by said entity;
- a recording medium, readable by a management entity, on which the program for such an entity is recorded.

The software modules may be stored in, or transmitted by, a data medium. This medium may be a hardware storage medium, for example a CD-ROM, a magnetic disk or a hard disk, or a transmission medium such as an electrical, optical or radio signal, or a telecommunication network.

An exemplary embodiment of the invention overcomes some deficiencies and/or drawbacks of the prior art and/or to make improvements thereto.

Although the present disclosure has been described with reference to one or more examples, workers skilled in the art will recognize that changes may be made in form and detail without departing from the scope of the disclosure and/or the appended claims.

The invention claimed is:

1. A method comprising:
    managing a network service that is in the process of being executed, in a communication network, said network service being formed by a sequence of at least one virtualized network function managed by a virtualized resources management entity that is controlled over the communication network by an orchestration entity, wherein the managing comprises the following acts implemented by a virtualized network function optimization entity able to communicate with the virtualized resources management entity over the communication network:
    receiving a stream signaling and/or characterizing a media from the at least one virtualized network function of said sequence, called an "initial function";
    determining, on the basis of said received stream signaling and/or characterizing a media, and of a predefined management rule associated with said stream, that said initial function has insufficient capacity for execution of said network service according to a given quality of service parameter associated with the network service; and
    directly sending, to said virtualized resources management entity managing the at least one virtualized network function, without a previous request to modify the sequence of at least one virtualized network function to the orchestration entity, an updating command comprising at least one action, produced on the basis of said management rule associated with said stream, for updating said sequence, said initial function being, after execution of said command, replaced or complemented in said sequence with at least one new virtualized network function capable of executing said network service according to the given quality of service parameter associated with the network service.

2. The method as claimed in claim 1, further comprising determining the capacity required for the given quality of service parameter of said network service, said required capacity being sent to the virtualized resources management entity with said updating command, the sequence being updated on the basis of said required capacity.

3. The method as claimed in claim 1, wherein, said initial function being implemented in a given first geographic area, said method comprises, before the sending act, if said initial function is implemented by saturated resources of said first area, a determination of a second geographic area having non-saturated resources, said updating command causing an update of said sequence, in which said at least one new virtualized network function belongs to said second geographic area.

4. The method as claimed in claim 3, wherein, a virtualized network function identical to said initial function, called an "identical function", being implemented in the second geographic area before the sending step, said updating command causes the virtualized resources management entity to replace said initial function or complement it, in the sequence, with said identical function.

5. The method as claimed in claim 1, wherein said network service formed from a sequence of at least one virtualized network function, called an "initial sequence", belongs to a list of network services of the orchestration entity controlling the virtualized resources management entity of said network, said method further comprising:
notification, by the virtualized resources management entity to said orchestration entity, of the updated sequence;
updating, by the orchestration entity, of the network service formed from the initial sequence in said list.

6. The method as claimed in claim 5, wherein the updating of the network service formed from the initial sequence comprises, in said list:
replacing the network service formed from said initial sequence with a network service formed from said updated sequence; or
adding a network service formed from said updated sequence.

7. A virtualized network function optimization entity, in a communication network, comprising:
a processor; and
a non-transitory computer-readable medium comprising instructions stored thereon, which when executed by the processor configure the virtualized network function optimization entity to perform acts comprising:
receiving a stream signaling and/or characterizing a media from a virtualized network function, called an "initial function", of a sequence of at least one virtualized network function forming a network service that is in the process of being executed, the at least one virtualized network function being managed by a virtualized resources management entity that is controlled over the communication network by an orchestration entity, and wherein the virtualized network function optimization entity is able to communicate with the virtualized resources management entity over the communication network;
determining, on the basis of said received stream signaling and/or characterizing a media, and of predefined management rules associated with said stream, that said initial function has insufficient capacity for execution of said network service according to a given quality of service parameter associated with the network service; and
directly sending, to the virtualized resources management entity responsible for managing said initial function, without a previous request to modify the sequence of at least one virtualized network function to the orchestration entity, a command for updating said sequence, said initial function being, after execution of said command, replaced or complemented in said sequence with at least one new virtualized network function capable of executing said network service according to the given quality of service parameter associated with the network service.

8. The optimization entity as claimed in claim 7, wherein the instructions further configure the virtualized network function optimization entity to determine the capacity required for the given quality of service parameter of said network service, the sending act comprising said capacity to said virtualized resources management entity with the updating command.

9. The optimization entity as claimed in claim 7, wherein the instructions further configure the virtualized network function optimization entity to determine a geographic area having non-saturated resources, the sending act comprising sending an updating command causing an update of said sequence, in which said at least one new virtualized network function belongs to said geographic area having non-saturated resources.

10. A virtualized resources management entity, in a communication network, comprising:
a processor; and
a non-transitory computer-readable medium comprising instructions stored thereon, which when executed by the processor configure the virtualized resources management entity to perform acts comprising:
managing a virtualized network function, called an "initial function", of a sequence of at least one virtualized network function forming a network service, the virtualized resources management entity being controlled over the communication network by an orchestration entity;
receiving a command for updating said sequence directly from a virtualized network function optimization entity over the communication network without a previous request to modify the sequence of at least one virtualized network function being sent to the orchestration entity that controls the virtualized resources management entity;
executing said updating command, said initial function being, after execution of said command, replaced or complemented in said sequence with at least one new virtualized network function capable of executing said network service according to a given quality of service parameter associated with the network service; and
sending a notification of the updating of said sequence to the orchestration entity.

11. A non-transitory computer-readable recording medium comprising program code instructions recorded thereon, which when executed by a processor of a virtualized network function optimization entity, configure the virtualized network function optimization entity to perform acts comprising:

managing a network service that is in the process of being executed, in a communication network said network service being formed by a sequence of at least one virtualized network function managed by a virtualized resources management entity that is controlled over the communication network by an orchestration entity, wherein the virtualized network function optimization entity is able to communicate with the virtualized resources management entity over the communication network, and wherein the managing comprises:

receiving a stream signaling and/or characterizing a media from a virtualized network function of said sequence, called an "initial function";

determining, on the basis of said received stream signaling and/or characterizing a media, and of a predefined management rule associated with said stream, that said initial function has insufficient capacity for execution of said network service according to a given quality of service parameter associated with the network service; and directly sending, to said virtualized resources management entity that manages the at least one virtualized network function, without a previous request to modify the sequence of at least one virtualized network function to the orchestration entity, an updating command comprising at least one action, produced on the basis of said management rule associated with said stream, for updating said sequence, said initial function being, after execution of said command, replaced or complemented in said sequence with at least one new virtualized network function capable of executing said network service according to the given quality of service parameter associated with the network service.

* * * * *